United States Patent
Webster et al.

(10) Patent No.: US 10,089,378 B2
(45) Date of Patent: Oct. 2, 2018

(54) AUTOMATIC ASSET VERSIONING

(75) Inventors: Roger R. Webster, San Martin, CA (US); Jeremy A. Hall, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 2628 days.

(21) Appl. No.: 11/343,340

(22) Filed: Jan. 30, 2006

(65) Prior Publication Data
US 2014/0032547 A1 Jan. 30, 2014

(51) Int. Cl.
*G06F 17/30* (2006.01)

(52) U.S. Cl.
CPC .. *G06F 17/30598* (2013.01); *G06F 17/30011* (2013.01)

(58) Field of Classification Search
USPC ........................................ 705/35–44
See application file for complete search history.

(56) References Cited

U.S. PATENT DOCUMENTS

| | | | |
|---|---|---|---|
| 5,357,631 A | 10/1994 | Howell | |
| 5,726,898 A * | 3/1998 | Jacobs | 700/231 |
| 5,890,176 A | 3/1999 | Kish et al. | |
| 6,112,181 A * | 8/2000 | Shear et al. | 705/1 |
| 6,628,412 B1 | 9/2003 | Jeran et al. | |
| 6,643,696 B2 | 11/2003 | Davis et al. | |
| 6,763,386 B2 | 7/2004 | Davis et al. | |
| 6,810,404 B1 | 10/2004 | Ferguson et al. | |
| 6,820,094 B1 | 11/2004 | Ferguson et al. | |
| 6,895,550 B2 | 5/2005 | Kanchirayappa et al. | |
| 6,898,625 B2 | 5/2005 | Henry et al. | |
| 6,910,184 B1 | 6/2005 | Yano et al. | |
| 2001/0014968 A1 * | 8/2001 | Mohammed | G06F 8/65 717/170 |
| 2002/0107886 A1 * | 8/2002 | Gentner | G06F 17/24 715/255 |

* cited by examiner

*Primary Examiner* — Olabode Akintola (74) *Attorney, Agent, or Firm* — Shook, Hardy & Bacon L.L.P.

(57) ABSTRACT

Assets or the locations where assets may appear are monitored. If a new asset appears within a monitored location or if an existing asset is copied, modified, or moved, a decision is made as to whether to assign a new unique identifier or to assign a new version number to an existing unique identifier. The unique identifiers and version numbers are carried as metadata within the assets and optionally also stored separately within a data store.

26 Claims, 4 Drawing Sheets

AUTOMATIC ASSET VERSIONING

FIELD

This application relates to electronic inventory management and in particular to techniques for automatic asset versioning.

BACKGROUND

Tracking and managing electronic assets are becoming more and more challenging in our highly connected and wired environments. Individuals and enterprises are increasing spending monetary and human capital to improve asset tracking. A variety of document management services are currently available in the industry to assist and accommodate the growing trend in this area.

Individuals and enterprises accumulate knowledge and transact their affairs via electronic assets, such as documents, presentations, images, videos, messages, graphics, and other electronic data. Many times these assets are generated and modified within their native software applications. These applications have their own default storage locations or directories. Often individuals are unfamiliar with these storage locations and may forget where a particular asset was housed.

In addition to this problem, some assets are version sensitive. This means that the author may want to maintain a variety of versions for a particular asset and revert back to a prior version at any particular point in time. To achieve this, individuals or enterprises may develop and manually adhere to a comprehensive naming scheme, such that specific versions of an asset are readily ascertainable from the asset's naming convention. Alternatively, individuals or enterprises may deploy a document management system.

The first approach is difficult to implement and relies on the discipline, training, and acceptance of the users; so, it generally suffers from lack of universal acceptance within an enterprise and suffers from quality problems since often forgetfulness may set the approach back.

The second approach necessitates an investment, within an enterprise, and requires that the desired document management system be operational when a user accesses an asset or requires that the document management system be integrated in the asset generating and modifying editors, such that the document management system can be initiated for each asset that a user may modify. Thus, a robust document management system is desirable to ensure it integrates with asset editors being used within an enterprise. Yet, new editors appear regularly and new versions of existing editors appear even more frequently. So, there is a regular integration and support issue that accompanies even the best document management solution within an enterprise.

Furthermore, if an audit history is desired for a particular asset then the first approach requires a detailed knowledge of the operating system such that ad hoc evaluation or customized programs may be developed to reproduce an audit history of the assets named with version-specific naming conventions. The second approach provides a better audit history technique but it relies on the document management system, such that if the document management system is offline or is replaced then the audit histories are unavailable or lost as well.

Thus, it can be seen that improved techniques for asset tracking are desirable.

SUMMARY

According to an embodiment, a method is provided for detecting and tracking a new asset. A new asset is detected within a storage location. In response to the asset detection, advice is requested to determine whether the new asset is to receive a unique identifier or not. Moreover, a unique identifier is generated for the asset in response to favorable advice and the unique identifier is recorded within metadata associated with the asset along with versioning information.

Other features will be apparent from the accompanying drawings and from the detailed description that follows.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present invention. It will be evident, however, to one skilled in the art that the present invention may be practiced without these specific details.

As used herein, the term "asset" may be used interchangeably with the term "resource." An asset refers to electronic data that may be viewed, played, and/or processed within a machine-accessible medium. For example, an asset may be a file, a document, an image, a message, an audio snippet, a video, a presentation, a graphic, a service, and the like. A service is a special type of asset that may be processed; a service can be an application or a collection of applications or modules that cooperate with one another as a system.

Assets may be housed within an electronic environment in one or more storage locations. A storage location may include memory, register space, physical storage, or a combination of these items. A storage location may also be viewed as a directory or a data store. A data store may include a relational database, an object oriented database, or a data warehouse that includes one or more disparate databases integrated with one another.

An asset may include "metadata." Metadata is information about the asset but may not be directly related to the content of the asset. It is often said to be data about data. That is, it is secondary data that describes primary data (content). Metadata may be carried within the storage of a particular asset itself, it may be carried external to the asset, or it maybe carried at least partially within the storage of the asset and external to the asset.

"Advice" may include electronic direction provided by one resource to another resource. The direction may be a particular selection of one of many presented options. Alternatively, advice may be embodied as policy and associated with a profile of configuration of a particular resource. Advice may be interactively and dynamically solicited and provided. Alternatively, advice may be gathered and processed in batch.

With this context, the description of various asset tracking services and systems are now described.

Figure 1:
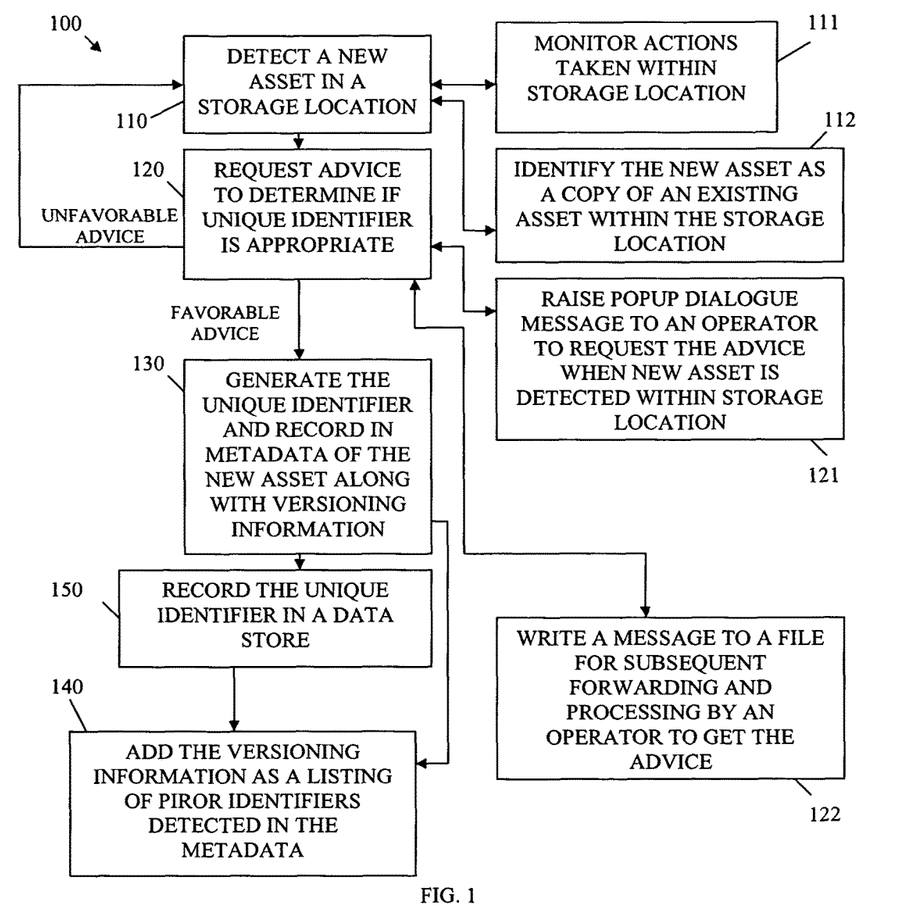
FIG. 1 is a diagram of a method for tracking a new asset, according to an example embodiment of the invention.

FIG. 1 is a diagram of a method 100 for tracking a new asset, according to an example embodiment of the invention. The method 100 (hereinafter "new asset tracking service") is implemented in a machine-accessible and readable medium and is operational over a network. The network may be wired, wireless, or a combination of wired and wireless.

The new asset tracking service may be processed in batch against desired storage locations within an electronic environment and processed interactively within the electronic environment in a real time and dynamic fashion. The new asset tracking service detects when a new or potentially new asset is present within the electronic environment and seeks advice on whether the asset should be tracked or not tracked. If tracking is to be performed, the new asset tracking service assigns a unique identifier to the new asset and that identifier may be included within the metadata of the new asset and/or within a separate and external data store. These features and others will now be described in detail with reference to FIG. 1.

At 110, the new asset tracking service detects a new asset in a storage location. The storage location may be identified as an operating parameter to the new asset tracking service, may be identified as an environmental variable, etc. In some cases, the storage location may be changed dynamically by an administrator that interacts via an administrator's interface to the new asset tracking service. The storage location may be one or more directories, one or more database or data store tables, one or more memory or register locations, or various combinations of these.

The new asset tracking service may process as a daemon within an operating system of one or more machines and regularly monitor the storage location for additions and/or changes to assets housed within the storage location. In some cases, the new asset tracking service may, upon initial start-up or upon initial communication of a new or changed storage location, process the entire storage location in an iterative fashion for new assets.

According to an embodiment, at 111, the new asset tracking service actively monitors actions taken within the storage location. This may entail evaluating operating system (OS) events that are raised and associated with the storage location and determining which of these events is related to new assets or potential new assets.

For example, at 112, the new asset tracking service may identify the new asset as a copy of an existing asset within the storage location. That is, an event may indicate that a copy of a particular file is occurring within the OS and within the storage location. In other cases, an event may indicate that an asset is being moved from one location into the storage location. In yet other cases, an event may indicate that a new file is being created or stored from some application within the storage location. The events are tracked and detected by the new asset tracking service to detect when new or potential assets are being placed or housed in the storage location.

At 120, the new asset tracking service requests advice to determine if the potential new asset is to be tracked and is to receive its own unique identifier. As was discussed above, the advice may be interactively obtained or may be obtained via profiles or configurations for a particular storage location, for a particular operator, for a particular grouping of operators, and/or for the new asset tracking service as a whole.

In an embodiment, at 121, the new asset tracking service may raise a popup dialogue message to an operator to request the advice interactively and dynamically. So, even if an operator was inside an application-specific service, such as a word processor, the new asset tracking service will detect a file (as an example of an asset) being stored within the storage location and will generate and communicate a popup dialogue message to request direction (as an example of advice) from the operator. In this manner, the new asset tracking service is not application specific and may be viewed as application independent. In other embodiments, profiles or configurations may dictate that the new asset tracking service save every change to an asset automatically, without any operator intervention at all.

In another example, at 122, the new asset tracking service may batch requests for advice for any given operator or group of operators. Thus, the new asset tracking service may write requests for advice as messages to a file, and may send the file to an operator or administrator at configurable times or intervals to obtain specific advice for each of the requests. Each message within the file may be viewed as a separate request for advice for a potentially newly detected asset.

In some cases, the advice received may be unfavourable. This indicates that either an operator or a profile or configuration indicates that the potential new asset is not to be tracked at all within the storage location. This can occur for a variety of reasons, for example a log file or debug file may appear within the storage location and tracking it is unnecessary. Of course a variety of other reasons may exist where there is no desire to track a given asset detected. In these cases, the new asset tracking service views these situations as assets that receive unfavourable advice indicating that they are to be ignored and not tracked by the new asset tracking service within the given storage location.

Assuming favourable advice is received for a newly detected asset, at 130, the new asset tracking service generates a unique identifier and records the unique identifier in metadata associated with the new asset. In addition, the metadata includes versioning information. Versioning information is data included within the metadata that permits a version for a particular asset to be resolved or determined. This may mean a specific version number or may mean information added that permits the new asset tracking service to resolve any specific version number for the asset in question. A separate data store, table, service, and/or data structure may be used by the new asset tracking service to generate unique identifiers for new assets.

According to an embodiment, the unique identifiers are global unique identifiers (GUID's). Thus, the GUID may be compatible with and derived from other applications that support the GUID. The metadata that includes the GUID has versioning information, as depicted at 140. Thus, the GUID and the versioning information are stored together within the metadata. The embodiment depicted at 140 shows that the versioning information may actually be an ordered listing of prior identifiers that were detected within the metadata of the new asset. So, versioning information may be represented as an ordered listing of prior unique asset identifiers and the listing included within the metadata of the new asset.

It is to be understood, however, that the unique identifier may also be a more complex and custom-developed piece of information. For example, the unique identifier may be hierarchical, such that various sub components or portions of the identifier identify different information. Thus, a more complex and hierarchical implementation of the unique identifier may have portions of the unique identifier that identify things such as asset type, asset author, asset classification, asset owner, and the like.

According to an embodiment, at 150, the new asset tracking service may also record the unique identifier in a separate data store. This provides some added benefits since any particular asset can be acquired and located from a central repository. It may also be the case that the unique identifier within the data store may include selective search terms or other selective metadata, such that the data store may serve as a locating service as well when a particular identifier is not known to a user.

By recording the unique identifier within the asset's metadata, the new asset tracking service or another service may reconstruct an audit history or version history, assuming the unique identifier includes versioning information. In addition, the data store if used may serve as a separate mechanism for achieving the same audit or version reconstruction. The two approaches are independent of one another and provide backup to one another.

As an example, consider two assets A and B each are different versions of one another. The metadata for B includes its own GUID and includes the GUID for A. So, by inspecting B it can be determined that B is a different and later version than A. If the chain of versions were longer, then each entire previous chain of GUID's may be retained within the metadata of later versions. In this manner, the version information may be constructed via the GUID and does not necessarily require additional versioning-specific data within the metadata.

It should also be noted that the detected asset need not physically reside within the storage location being monitored by the new asset tracking service. That is, the native and physical location of the new asset may be referenced as a soft link or pointer from within the storage location. Thus, the new asset tracking service may manage and track assets as links or as native and actual locations. So, an enterprise does not have to restructure the physical topology of its assets; rather the assets may be managed via soft links from a defined storage location.

Figure 2:
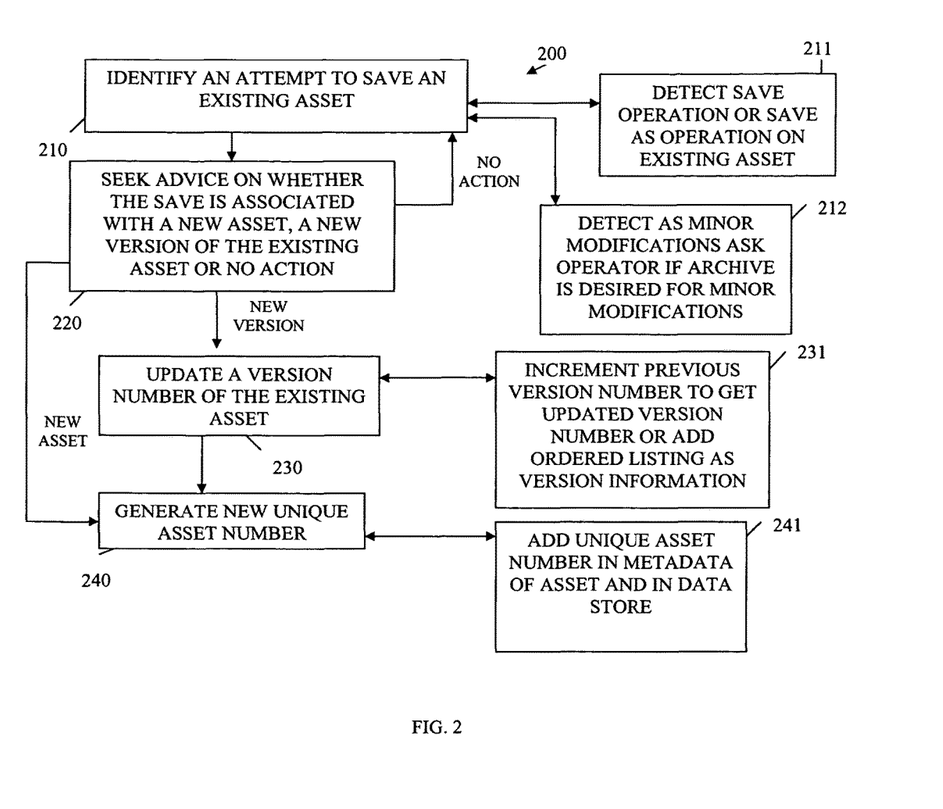
FIG. 2 is a diagram of a method for tracking a new asset or for tracking version information for an existing asset, according to an example embodiment of the invention.

FIG. 2 is a diagram of a method 200 for tracking a new asset or for tracking version information for an existing asset, according to an example embodiment of the invention. The method 200 (hereinafter "tracking service") is implemented in a machine-accessible and readable medium and is accessible over a network. The network may be wired, wireless, or a combination of wired and wireless. The tracking service presents an enhanced view of the processing associated with the new asset tracking service represented by the method 100 of the FIG. 1 in that the tracking service also manages and tracks existing assets being tracked.

At 210, the tracking service identifies an attempt by an operator to save an existing asset that is known and being tracked by the tracking service. At 211, the save may be detected as a save to an existing asset or may be detected as a "save as" operation for an existing asset. The tracking service does not have to be integrated or interfaced into the application or service that the operator uses to perform the save or save as operation; rather, these actions may be detected as monitored events within the OS that the tracking service is designed to monitor. However, in some embodiments, the tracking service may, if desired, integrate within an Application Programming Interface (API) of an asset editor, such that the save or save as action from an operator within the asset editor is detected from the asset editor's API. It is to be understood that either approach or both approaches may be used.

In some cases, at 212, where the action is detected as a save and not a save as, it may be that the changes to the existing asset where minor modifications and an operator may or may not want to track these minor modifications as a new version of the existing asset. Accordingly, the tracking service may ask the operator if an archive is desired. An archive is a special action of the tracking service that forces a new version number for an existing asset.

At 220, the tracking service may seek advice on whether the save is to be associated with a new asset or a new version of an existing asset. In some cases, the save may generate advice associated with no action at all, such as in the situation discussed above at 212, where there are minor modifications to the existing asset and there is no operator desire to archive the changes. Of course there can be any operator-desired reason for taking no action and taking no action is actually viewed as advice to the tracking service. In fact, in some cases a non response from the operator may by default be viewed as a no-action advice situation by the tracking service.

The advice may be communicated or received in a variety of manners, such as dynamically, in batch, interactively, by profile, by configuration, and the like. Examples of this were presented above with the new asset tracking service represented by the method 100 of the FIG. 1.

At 230, the tracking service receives advice that indicates a new version of an existing asset is to be generated for the existing asset in which a save was detected. Again, that advice may be a configuration file that indicates every change to the asset is to be identified as a new version. Alternatively, the advice may be interactive with the assistance of the operator. In response to this advice, the tracking service updates a current or previous version number associated with the existing asset to reflect a newer or later version. In some cases, at 231, this may entail incrementing a previous version number to get an updated version number. Thus, if an existing asset has a GUID of Y and a version number of 1 identified within its metadata, then the new version of the existing asset may have metadata that includes the new version's GUID of Z and a version number of 2 (incremented previous version number of 1).

The version number may be hierarchical and more complex as well, much like software releases so major changes may be reflected in an integer increment in the version number and minor changes may be reflected in a floating point portion of the version number. For example, version N.x may represent major version number represented by the integer value N and minor version number represented by the floating point portion x.

In other cases, also at 231, the version number may be derived. For example, if the existing asset's metadata includes its GUID as Y and a listing of two other GUID's as W and X, then the version number may be derived without specifically being enumerated as version 4 and the metadata for the new version would include the list of GUID's W, X, Y and the new derived version would include the new versions GUID of Z and be identified as W, X, Y, and Z. So, the version number does not have to actually appear in the metadata; rather, in some embodiments the versioning number may be derived from ordered listings of other GUID's.

At 240, the tracking service receives advice that indicates an entirely new unique asset number is to be associated with the detected save on an existing asset. This results in a new unique identifier being generated for the existing asset and a new asset is created. That is, the existing asset before the save was generated remains as it was and retains its prior asset identifier or number and its prior versioning information and an entirely new asset is generated and associated with the new unique asset number or identifier. At 241, the unique asset number may be added within the metadata of the asset and also within a data store. Again, the asset number or identifier may be stored in one of these areas or in both and each are independent of the other and yet complementary to one another.

It is also noted, that even if a new version for the existing asset is being processed at 230, the new version will receive its own unique asset number at 240. Each tracked asset includes its own unique asset number or identifier.

Figure 3:
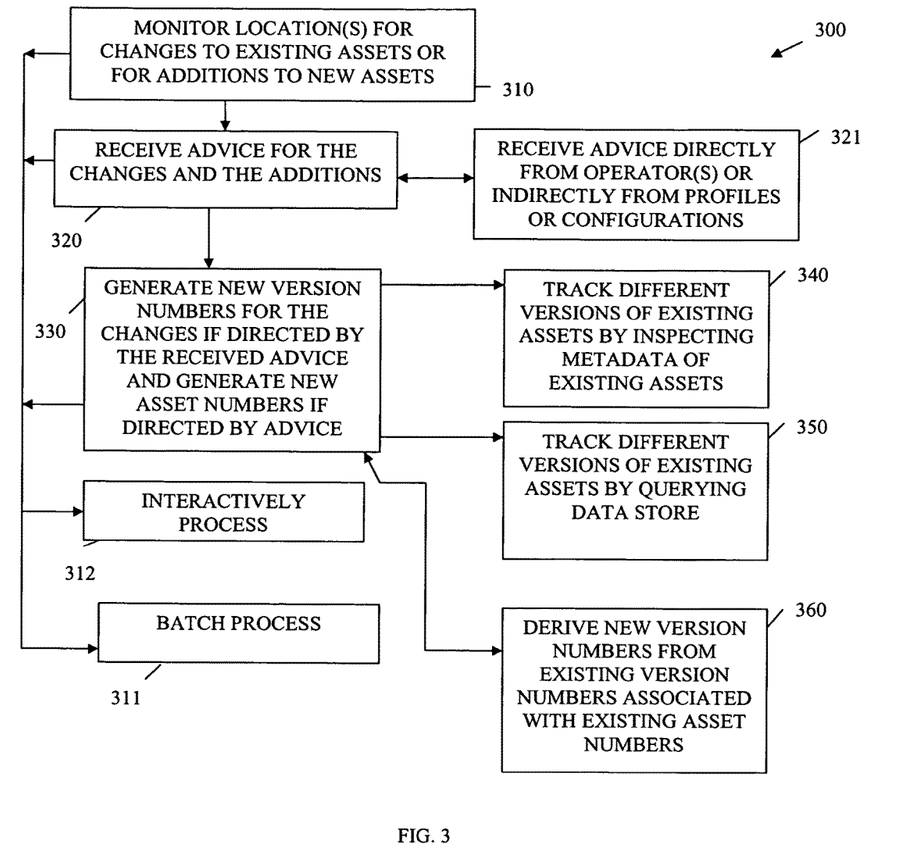
FIG. 3 is a diagram of an asset tracking service, according to an example embodiment of the invention.

FIG. 3 is a diagram of an asset tracking service 300, according to an example embodiment of the invention. The asset tracking service 300 is implemented as instructions within a machine-accessible and readable medium and is operational and accessible over a network. The network may be wired, wireless, or a combination of wired and wireless. The instructions implement, among other things, the methods 100 and 200 of the FIGS. 1 and 2 and provide for other beneficial features described herein and below.

The instructions may be embodied on removable media and subsequently interfaced to a machine where they are uploaded and processed. Alternatively, the instructions may be pre-fabricated within storage and/or memory of a machine for processing. In still other arrangements, the instructions may be downloaded over the network from one machine and processed on another machine. In yet another situation, the instructions may be remotely processed from one network machine at the direction of another network machine.

At 310, the instructions monitor one or more locations for changes to existing assets or for additions of new assets. This may occur in batch mode at initial start-up of the instructions or upon detection or instruction of a new location to monitor as depicted at 311. It may also occur interactively as changes are being made within a monitored location as depicted at 312. Batch and interactive (e.g., dynamic and real time) processing may both occur with different modes of operations of the instructions. Moreover, the instructions may automatically, dynamically, and in real time switch between modes of operation depending upon circumstances or policies.

At 320, the instructions receive advice for the changes and the additions with respect to existing or new assets. In an embodiment, at 321 the advice may be received directly from the operator, such as when the instructions dynamically and interactively request and prompt the operator for the advice; or the instructions may receive the advice indirectly from profiles or configurations associated with the operator, the assets in questions, types associated with the assets in question, the locations housing references to the assets in question, and/or the instructions themselves.

At 330, if the advice received is associated with a new version of an existing asset, then the instructions generate a new version number to be associated with the existing asset. Alternatively, and still at 330, if the advice received is associated with a new asset, then the instructions generate a new asset number to be associated with the asset in question.

According to an embodiment, at 340, the instructions may track different version of existing assets by inspecting metadata of the existing assets. So, an audit history of version history may be derived by inspecting metadata of similar or related asset numbers or identifiers within the storage locations to assemble the desired versioning log or trail. This may be done independent of any particular external data source.

In another embodiment, at 350, the instructions may assemble an audit or version history for a particular asset or a group of assets by tracking different versions via queries to an external data store. So, in this embodiment, the instructions utilize versioning information housed external from the assets and within a data store to assemble a version or audit log. This may be done independent of the approach used in 340.

According to an embodiment, at 360, the instructions may derive new version numbers from existing version numbers associated with existing asset numbers or identifiers. As was also mentioned above, related assets may be associated via the asset number or identifier; so, the number or identifier may include hierarchical information, such as asset type, asset author, etc.

Figure 4:
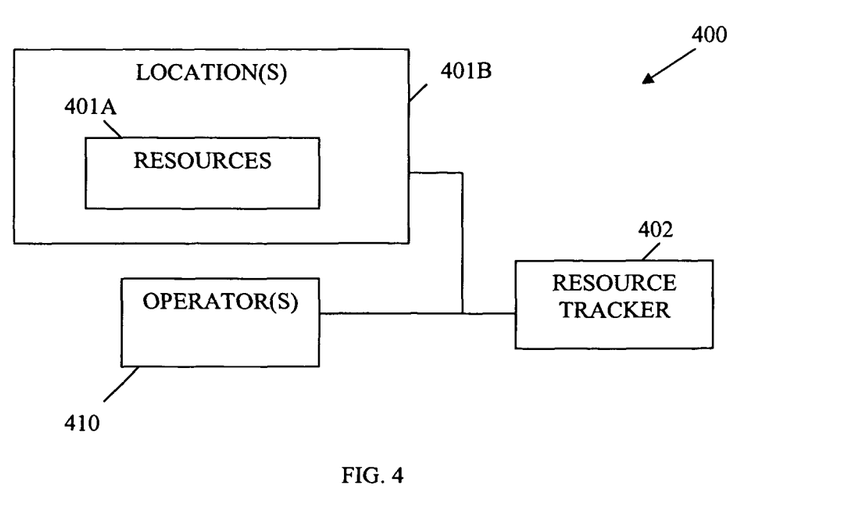
FIG. 4 is a diagram of an asset-tracking system, according to an example embodiment of the invention.

FIG. 4 is a diagram of an asset-tracking system 400, according to an example embodiment of the invention. The asset-tracking system 400 is implemented in a machine-accessible and readable medium and is accessible or operational over a network. The network may be wired, wireless, or a combination of wired and wireless. According to an embodiment, the asset-tracking system 400 implements, among other things, the methods 100, 200, and 300 depicted and described within the contexts of FIGS. 1-3.

The asset-tracking system 400 includes resources 401A and a resource tracker 402. The resources 401A are referenced and/or housed within storage locations 401B and are created, modified, and removed by operators 410. Each of these will now be discussed in turn.

The resources 401A may include electronic documents, files, images, messages, graphics, videos, audio snippets, presentations, software applications, software systems, hardware devices, and the like. Resources 401A that are being tracked and managed include unique identifiers or numbers. In some cases, these identifiers are hierarchical and include additional information such as categories, types, author information, versioning information, and the like.

The resource tracker 402 monitors locations 401B for new resources 401A that are being added to the locations 401B and/or for existing resources 401A that are being modified in some manner within the locations 401B.

The resource tracker 402 assigns unique identifiers to new resources 401A and derives, assigns, and tracks version numbers for each unique identifier. It is noted that the unique identifier is unique for each and every asset and in some embodiments the unique identifier is acquired from another application or resource-specific service as a GUID, which the resource tracker 402 acquires and utilizes for its purposes. Also and as was discussed in detail above, the version numbers need not be specifically stated in the metadata; rather, they may be derived from the metadata as ordered listings of other unique identifiers. So, existing resources 401A may include a plurality of versions and each version is a different resource 401A referenced within the locations 401B and each different resource 401A has its own unique identifier; the version number may be explicitly stated or may be derived from listings included within the metadata of each different resource 401A.

The resource tracker 402 detects when resources 401A are moved, copied, created, and/or modified within the locations 401B. These actions may be detected as OS events and may be independent of any particular resource editor. Alternatively, in some embodiments, the resource tracker 402 may integrate with API's of specific resource editors to acquire these actions with respect to the resources 401A.

In response to detected actions, the resource tracker 402 seeks advice from an operator 410. The advice dictates subsequent actions taken by the resource tracker 402. The resource tracker 402 may take no action, may generate a new unique resource identifier, or may generate a new version number to be associated with an existing resource identifier.

The resource identifier and versioning information may be stored in metadata associated with the resources 401A themselves and/or may be stored in a separate external data store. The operator 410 may be a user or administrator interacting with a resource 401A; or, the operator 410 may itself be an automated resource 401A or service.

The resource tracker 402 may be processed in an interactive mode and a batch mode. It may automatically switch between interactive and batch mode depending upon the situation or circumstances.

According to an embodiment, the resource tracker 402 may recreate a version history for a specific one of the plurality of resources 401A by inspecting metadata of the plurality of resources 401A. In another embodiment, the resource tracker 402 may recreate a version history for a specific one of the plurality of resources 401 by inspecting a data store having the resource identifiers and resource versioning information.

It is now understood how more flexible and robust asset/resource tracking techniques may be implemented and deployed for purposes of permitting individuals and enterprise to better monitor and assimilate their knowledge and services.

The above description is illustrative, and not restrictive. Many other embodiments will be apparent to those of ordinary skill in the art upon reviewing the above description. The scope of embodiments should therefore be determined with reference to the appended claims, along with the full scope of equivalents to which such claims are entitled.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method comprising:
   using one or more processors to perform operations of:
   detecting a new asset in a monitored storage location, wherein the detecting is performed by a daemon configured to detect an operating system event that is raised and associated with the monitored storage location, and wherein the operating system event is raised upon a conducting of operations including at least adding the new asset to the monitored storage location;
   requesting advice in a form of a user input as to whether the new asset is to receive a unique identifier; and
   generating the unique identifier in response to favorable advice and recording the unique identifier in metadata associated with the new asset along with versioning information.

2. The method of claim 1, wherein detecting further includes monitoring actions taken within the monitored storage location to detect the new asset, and wherein the monitored storage location is one or more directories monitored by the daemon.

3. The method of claim 1, wherein detecting further includes identifying an existing asset that is copied as the new asset within the monitored storage location.

4. The method of claim 1, wherein requesting further includes communicating a message to an administrator to request the advice when the new asset is detected within the monitored storage location by the daemon.

5. The method of claim 1, wherein requesting further includes writing a message to a file for subsequent forwarding to a user along with other messages within the file to request the advice, wherein the file is sent at a configured time or upon detection of a configured event to the user.

6. The method of claim 1, wherein generating further includes recording the unique identifier in a data store.

7. The method of claim 1, wherein generating further includes adding the versioning information as a listing of zero or more unique identifiers detected in the metadata.

8. A method comprising:
   using one or more processors to perform operations of:
   identifying an attempt to save an existing asset in a storage location by monitoring the storage location, wherein the existing asset is already housed in the monitored storage location;
   seeking advice in a form of a user input on whether the save is to be associated with a new version of the existing asset, on whether the save is to be associated with a new asset, or on whether the save is to generate no action;
   updating version information of the existing asset and generating a new unique asset number if dictated by the advice; and
   taking no action if dictated by the advice.

9. The method of claim 8, wherein identifying further includes detecting a save operation or a save as operation from an operator accessing the existing asset.

10. The method of claim 8, wherein updating further includes incrementing a previous version number to generate an updated version number and recording the updated version number in metadata associated with the asset and in a data store and adding the new asset number in the metadata and in the data store.

11. The method of claim 8, wherein updating further includes updating the versioning information as a listing of prior asset numbers detected in metadata associated with the existing asset and adding an asset number associated with the existing asset to the listing.

12. The method of claim 8, wherein seeking further includes detecting the attempt to save as minor modifications to the existing asset and determining whether an administrator associated with the minor modifications desires to archive the minor modifications to generate the new version of the asset.

13. A non-transitory machine-readable medium having instructions data stored thereon to cause the machine to:
   monitor one or more storage locations for changes to existing assets or for additions of new assets in the one or more monitored storage locations;
   receive advice, in a form of a user input, for the changes and the additions; and
   generate new version numbers for the changes if directed by the advice and generating new unique asset numbers for the additions if directed by the advice.

14. The medium of claim 13 further comprising instructions to track different versions of the existing assets by inspecting metadata associated with the existing assets.

15. The medium of claim 13 further comprising instructions to track different versions of the existing assets by querying a data store that maintains associations for versions of the existing assets.

16. The medium of claim 13 further comprising instructions to interactively process the instructions.

17. The medium of claim 13 further comprising instructions to process the instructions in batch at configured times or intervals.

18. The medium of claim 13, wherein receiving advice further includes at least one of receiving the advice directly from an administrator and receiving the advice indirectly from profiles or configurations associated with the administrator.

19. The medium of claim 13 further comprising instructions to derive the new version numbers from existing version numbers associated with existing asset numbers.

20. A machine-implemented system, comprising:
a memory; and
a processor coupled to the memory, the processor to implement:
a plurality of resources stored in a location of the memory; and
a resource tracker configured to assign unique identifiers to the plurality of resources stored in the location of the memory and is to derive and track version numbers for each of the unique identifiers, and wherein the resource tracker is further configured to detect when the plurality of resources are created, moved, copied, or modified relative to the location of the memory and determine based on advice in a form of a user input as to whether to take no action, to generate new version numbers for existing unique identifiers, or to generate new unique identifiers for new resources that are to be included with the plurality of resources in the location of the memory.

21. The system of claim 20, wherein the plurality of resources include at least one of documents, presentations, images, videos, graphics, software programs, messages, and files.

22. The system of claim 20, wherein the resource tracker is further configured to monitor, as an operating system service, the location for changes to the plurality of resources or for the addition of the new resources therein, wherein the location is one or more directories.

23. The system of claim 20, wherein the resource tracker is further configured to process in an interactive and a batch mode.

24. The system of claim 20, wherein the resource tracker is further configured to record the unique identifiers and the version numbers within metadata associated and carried with the plurality of resources and to record the unique identifiers and the version numbers within a separate data store.

25. The system of claim 24, wherein the resource tracker is further configured to recreate a version history for a specific one of the plurality of resources by inspecting the metadata from several of the plurality of resources.

26. The system of claim 24, wherein the resource tracker is further configured to recreate a version history for a specific one of the plurality of resources by inspecting the data store.

* * * * *